United States Patent
Zhang et al.

(10) Patent No.: US 12,532,248 B2
(45) Date of Patent: Jan. 20, 2026

(54) ENHANCING WIRELESS COMMUNICATIONS WITH A DEDICATED-SCAN RADIO

(71) Applicant: Google LLC, Mountain View, CA (US)

(72) Inventors: Ning Zhang, Saratoga, CA (US); Ahmed Ibrahim ElArabawy, San Diego, CA (US); Kai Shi, San Jose, CA (US)

(73) Assignee: Google LLC, Mountain View, CA (US)

(*) Notice: Subject to any disclaimer, the term of this patent is extended or adjusted under 35 U.S.C. 154(b) by 362 days.

(21) Appl. No.: 17/440,264

(22) PCT Filed: Sep. 11, 2019

(86) PCT No.: PCT/US2019/050601
§ 371 (c)(1),
(2) Date: Sep. 17, 2021

(87) PCT Pub. No.: WO2020/231459
PCT Pub. Date: Nov. 19, 2020

(65) Prior Publication Data
US 2022/0159558 A1    May 19, 2022

Related U.S. Application Data

(60) Provisional application No. 62/847,551, filed on May 14, 2019.

(51) Int. Cl.
*H04W 48/16* (2009.01)
*H04W 24/10* (2009.01)
(Continued)

(52) U.S. Cl.
CPC .......... *H04W 48/16* (2013.01); *H04W 24/10* (2013.01); *H04B 17/318* (2015.01); *H04W 74/0816* (2013.01); *H04W 88/18* (2013.01)

(58) Field of Classification Search
CPC ................. H04W 24/10; H04W 48/16; H04W 74/0816; H04W 88/18; H04W 36/00
See application file for complete search history.

(56) References Cited

U.S. PATENT DOCUMENTS 6,185,423 B1 * 2/2001 Brown ................. H04W 36/06
                                                         455/574
8,630,255 B1    1/2014 Kunz et al.
(Continued)

FOREIGN PATENT DOCUMENTS

CN         1860806 B     7/2011
CN       102067459 A     8/2014
(Continued)

OTHER PUBLICATIONS

"International Search Report and Written Opinion", PCT Application No. PCT/US2019/050601, Dec. 17, 2019, 19 pages.
(Continued)

*Primary Examiner* — Syed Ali

(57) ABSTRACT

Techniques are described for using a dedicated-scan radio to improve scanning and other radio operations performed during wireless communications. The techniques include configuring a dedicated-scan radio to collect and cache scan results without interfering with ongoing wireless communication tasks performed using primary radios. Based on the scan results cached by the dedicated-scan radio, the computing device improves other radio operations in furtherance of wireless communications. Cached scan results enable a primary radio to avoid, or to focus on, scanning certain channels or frequencies during discovering, positioning, or roaming operations. By using the dedicated-scan results as a starting point or seed for functions performed by a primary radio, the computing device may more quickly and more (Continued)

efficiently perform radio functions, minimizing latency to ongoing wireless communications.

20 Claims, 8 Drawing Sheets

(51) Int. Cl.
*H04B 17/318* (2015.01)
*H04W 74/0816* (2024.01)
*H04W 88/18* (2009.01)

(56) References Cited

U.S. PATENT DOCUMENTS

| | | | |
|---|---|---|---|
| 9,942,833 B2 | 4/2018 | Bhasin et al. | |
| 2003/0144020 A1* | 7/2003 | Challa | H04W 56/0035 455/69 |
| 2005/0128988 A1* | 6/2005 | Simpson | H04W 48/16 370/338 |
| 2010/0234021 A1 | 9/2010 | Ngai et al. | |
| 2012/0197868 A1* | 8/2012 | Fauser | G06F 16/183 707/E17.054 |
| 2012/0257550 A1 | 10/2012 | Chin et al. | |
| 2014/0087727 A1 | 3/2014 | Walton | |
| 2014/0376405 A1* | 12/2014 | Erickson | H04L 9/0861 370/254 |
| 2015/0139207 A1* | 5/2015 | Seok | H04W 52/0225 370/338 |
| 2015/0264614 A1 | 9/2015 | Stager et al. | |
| 2017/0094589 A1* | 3/2017 | Bhasin | H04W 48/18 |
| 2017/0245280 A1* | 8/2017 | Yi | H04K 3/00 |
| 2019/0254047 A1* | 8/2019 | Ahmed | H04W 74/0816 |
| 2019/0364492 A1* | 11/2019 | Azizi | H04L 67/12 |
| 2020/0100115 A1* | 3/2020 | Skaaksrud | B64D 45/00 |
| 2020/0106832 A1* | 4/2020 | Kim | H04L 12/281 |
| 2024/0388937 A1* | 11/2024 | Murias | H04W 24/10 |

FOREIGN PATENT DOCUMENTS

| | | |
|---|---|---|
| EP | 2037716 | 3/2009 |
| WO | 2015105813 | 7/2015 |
| WO | 2020231459 | 11/2020 |

OTHER PUBLICATIONS

"International Preliminary Report on Patentability", Application No. PCT/US2019/050601, Nov. 16, 2021, 13 pages.

Translation of Chinese Office Action mailed May 27, 2024 for CN Application No. 201980095394.4, 22 pages.

Translation of Chinese Office Action mailed Nov. 5, 2024 for CN Application No. 201980095394.4, 14 pages.

Chinese Office Action mailed Jan. 26, 2025 for CN Application No. 201980095394.4, 9 pages.

* cited by examiner

ENHANCING WIRELESS COMMUNICATIONS WITH A DEDICATED-SCAN RADIO

RELATED APPLICATION(S)

This application is a national stage entry of International Application No. PCT/US2019/050601, filed Sep. 11, 2019, which in turn claims priority to U.S. Provisional Application No. 62/847,551, filed May 14, 2019, the disclosures of which are incorporated herein by reference in their entireties.

BACKGROUND

In wireless communications, a computing device often has to "scan" for nearby nodes. The computing device "scans" to estimate signal strength, determine capabilities, and infer locations of nearby nodes. A scan may direct a radio to cease communicating on an operating channel for a period of time (e.g., a dwell time) to instead listen on other channels for signals from nearby nodes. For example, the computing device performs a connectivity scan to identify a list of available wireless networks for network selection. A connectivity scan requires accurate received-signal-strength-intensity (RSSI) indicators in order to enable the network selection and it is typically initiated by a system-level component (e.g., an operating system) as opposed to an application. A roaming scan may not require as accurate RSSI and, although the operating system or another system-level component may initiate a roaming scan, an application often initiates a roaming scan too. A preferred network operation (PNO) scan is a specific type of connectivity scan that is limited to scanning a saved-list of "preferred" channels or networks previously visited by the computing device. A location scan is performed for enabling location-based functions and services. As its name suggests, a location scan is not a type of connectivity scan and therefore does not typically require accurate RSSI indicators. During scanning, the latency of ongoing traffic within operating channels can increase, and the amount of power consumed by the computing device to scan for nearby nodes, as compared to when the computing device is not scanning, may also increase.

SUMMARY

Techniques are described for using a dedicated-scan radio to improve scanning and other radio operations performed during wireless communications. The techniques include configuring a dedicated-scan radio to collect and cache scan results in the background (e.g., continuously, quasi-continuously) and without interfering with ongoing wireless communication tasks performed using primary radios. A computing device uses scan results cached by the dedicated-scan radio to improve other radio operations that the computing device performs in furtherance of wireless communications. Maintaining results of scans that were recently performed in the background enables a primary radio to avoid, or to focus on, scanning certain channels or frequencies during discovering, positioning, roaming, or performing other radio operations. By using the dedicated-scan results as a starting point or seed for functions performed by a primary radio, for example, the computing device operates more quickly and more efficiently when performing primary radio functions than without relying on the dedicated-scan results, which can minimize introducing latency to ongoing wireless communications.

In one example, a computer-implemented method includes communicating, using a primary radio of a computing device, with a first network node, and while communicating with the first network node using the primary radio, storing scan results generated by a dedicated-scan radio of the computing device that repeatedly scans for first wireless signals. The computer-implemented method further includes scanning, using the primary radio and based on the scan results generated by the dedicated-scan radio, for second wireless signals, determining a second network node from the second wireless signals, and communicating, using the primary radio, with the second network node identified from the second wireless signals.

In a further example, a computing device is described that includes at least one processor configured to perform the preceding computer-implemented method.

In a further example, a system is described, including means for performing the preceding computer-implemented method.

In another example, a computer-readable storage medium is described that includes instructions that, when executed, configure a processor of a computing device to perform the preceding computer-implemented method.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

One or more aspects of using a dedicated-scan radio to enhance wireless communications with a computing device are described in detail below. The use of the same reference numbers in different instances in the description and the figures indicate similar elements.

DETAILED DESCRIPTION

Figure 1:
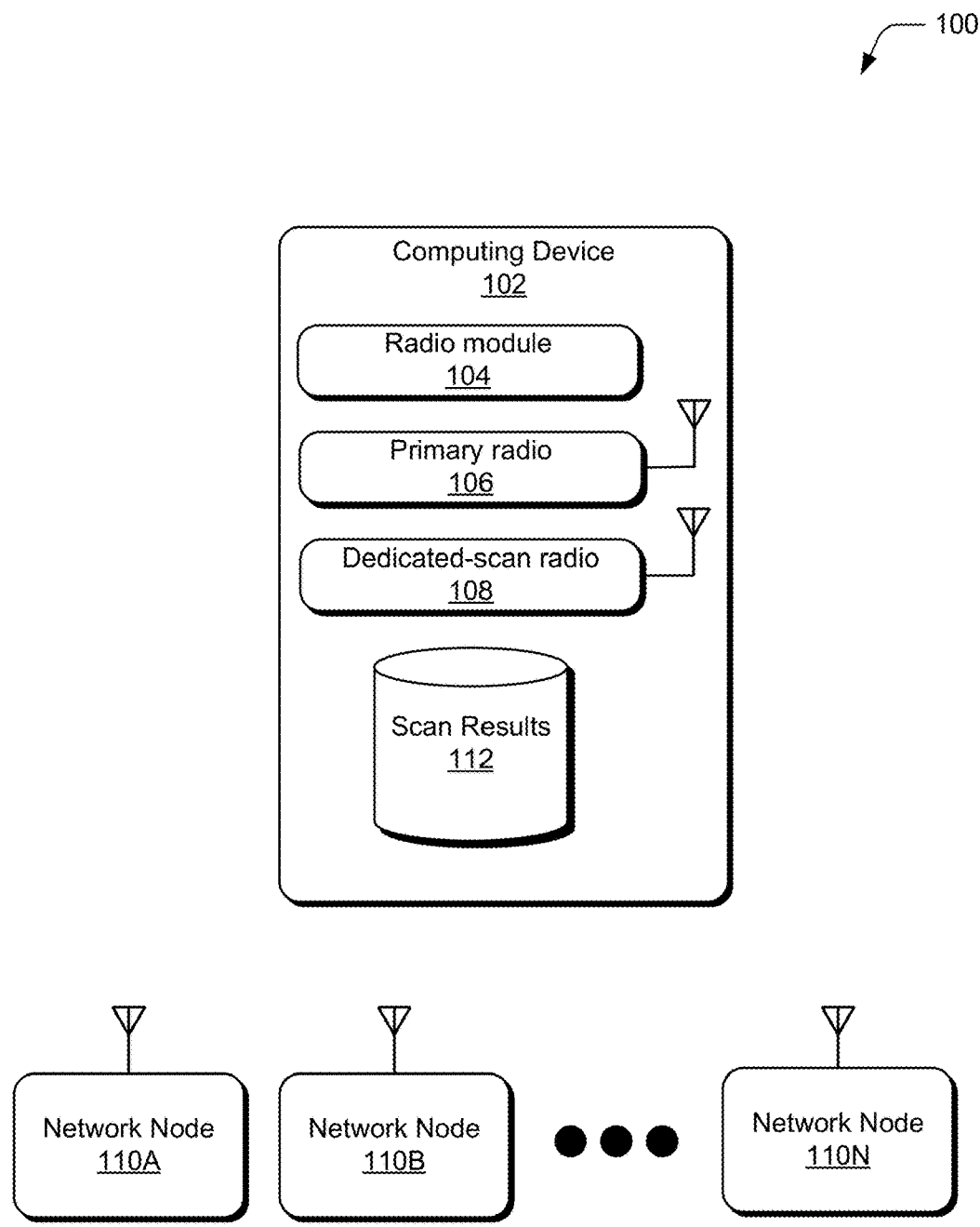
FIG. 1 is a conceptual diagram illustrating an example computing system including an example computing device configured to enhance wireless communications using a dedicated-scan radio.

FIG. 1 is a conceptual diagram illustrating an example computing system 100, including an example computing device 102 configured to enhance wireless communications using a dedicated-scan radio 108. In addition to the dedicated-scan radio 108, the computing device 102 maintains scan results 112 and includes a radio module 104 and a primary radio 106. The computing system 100 further includes network nodes 110A and 110B through 110N (collectively "network nodes 110"). The computing system 100, the computing device 102, and the network nodes 110 may each include additional or fewer components than what is shown in FIG. 1.

Each of the network nodes 110 represents a wireless device accessed by the computing device 102 to communicate on a wireless network. Numerous examples of the network nodes 110 exist. The network nodes 110 can be wireless access points for one or more networks. Network node 110A can be a router configured as an access point to a network. Network node 110B may be a base station for a cellular network. Network node 110N may be a mobile device configured as a "hot spot" or soft-network node enabling another mobile device to communicate on the cellular network using the mobile device's connection.

The computing device 102 can be any type of mobile or non-mobile computing device configured for wireless communication. As a mobile computing device, the computing device 102 can be a mobile phone, a laptop computer, a wearable device (e.g., watches, eyeglasses, headphones, clothing), a tablet device, an automotive/vehicular device, a portable gaming device, an electronic reader device, a remote-control device, or other mobile computing device. As a non-mobile computing device, the computing device 102 may include a computer (e.g., a desktop, a server, a mainframe, a terminal), a television device, a display device, an entertainment set-top device, a streaming media device, a tabletop assistant device, a non-portable gaming device, business conferencing equipment, or other non-mobile computing device. As previously indicated, the computing device 102 includes the radio module 104, the primary radio 106, the dedicated-scan radio 108, and the scan results 112. These and other components of the computing device 102 are communicatively coupled in various ways, including through internal wired and wireless buses and links.

For ease of description, each of the primary radio 106 and the dedicated-scan radio 108 of the computing device 102 is described as a single, independent radio. Each of the primary radio 106 and the dedicated-scan radio 108 may include multiple radios (e.g., transceivers) that collectively, or independently perform the operations associated with the primary radio 106 and the dedicated-scan radio 108, as described herein. The primary radio 106 and the dedicated-scan radio 108 may be part of a single radio system or a radio system on a chip (SoC). The primary radio 106 and the dedicated-scan radio 108 may occupy a portion of a single hardware unit of the computing device 102 and may be operatively coupled and/or communicatively coupled via one or more shared buses, power supplies, memories, pins, or other connections or links.

The primary radio 106 enables the computing device 102 to wirelessly communicate data with other computing devices, such as the network nodes 110. The primary radio 106 sends and/or receives wireless signals to and/or from network node 110B, for example, to enable the computing device 102 to communicate on a cellular network.

The dedicated-scan radio 108 enables the computing device 102 to scan for wireless signals, independent of operations performed with the primary radio 106. The dedicated-scan radio 108 may be a specialized radio configured for scanning. The dedicated-scan radio 108 may be a receive-only radio that is not capable of transmitting wireless signals and therefore suited for passive scanning. Alternatively, the dedicated-scan radio 108 may include transmission capability, for example, for active scanning in addition, or as an alternative to passive scanning. The dedicated-scan radio 108 detects wireless signals from some or all of the network nodes 110, for example, to facilitate the computing device 102 in detecting a network or a different connection to a network.

The dedicated-scan radio 108 caches the scan results 112 obtained from executing scanning operations. The scan results 112 are a buffer, a data store, a database, a table, or other data structure. The scan results 112 include information that the radio module 104 (and other components of the computing device 102) uses to estimate signal strength, determine capabilities, and infer locations of the network nodes 110.

The primary radio 106 and the dedicated-scan radio 108 share data (e.g., the scan results 112) via a common memory, registers, or other internal memory. For example, the dedicated-scan radio 108 writes the scan results 112 to an internal cache memory of the dedicated-scan radio 108. The primary radio 106 and the radio module 104 may access the internal cache memory of the dedicated-scan radio 108 to read the scan results 112 to perform radio operations based on the scan results 112.

The radio module 104 controls the primary radio 106 and the dedicated-scan radio 108 to enable the computing device 102 to communicate with the network nodes 110. The radio module 104 communicates information with the primary radio 106 and the dedicated-scan radio 108. For example, the radio module 104 accesses the scan results 112 generated by the dedicated-scan radio 108 to generate control signals, messages, or commands that when sent, configure the primary radio 106 in a particular way, e.g., to further communications between the computing device 102 and the network nodes 110.

The radio module 104 may be implemented in hardware, software, firmware, or a combination thereof. A processor of the computing device 102 executes instructions stored in a memory of the computing device 102 to implement the functions described with respect to the radio module 104. The radio module 104 may be firmware loaded on a SoC including instructions for controlling the primary radio 106 and the dedicated-scan radio 108. The radio module 104 may be driver software that interfaces with firmware or a framework of the computing device 102, for example, which loads an operating system. The radio module 104 may be part of the operating system or part of a framework executing at the computing device 102. The radio module 104 may be an application or service executing within an operating environment provided by the operating system or the framework.

To connect or communicate wirelessly, the radio module 104 controls the primary radio 106 to scan for nearby nodes, including the network nodes 110. The radio module 104 directs the primary radio 106 to cease communicating (e.g., with the network node 110A) on an operating channel for a period of time (e.g., a dwell time) and instead, the radio module 104 directs the primary radio 106 to listen on other, different channels for signals from nearby nodes. During scanning, the latency of ongoing traffic intended for the primary radio 106 increases while the primary radio 106 is busy scanning. For example, the network node 110A holds ongoing traffic intended for the primary radio 106 until communication with the network node 110A resumes. The amount of power consumed by the computing device 102 to scan for nearby nodes using the primary radio 106 also increases, as compared to when the computing device 102 is not scanning.

The radio module 104 directs the primary radio 106 to frequently scan to estimate signal strength, determine capabilities, and infer locations of the nearby nodes, e.g., to perform various functions. For example, when selecting a respective wireless local area network (WLAN) associated with each of the network nodes 110A and 110B, the radio module 104 scans for wireless signals transmitted by the network nodes 110. The radio module 104 determines respective RSSI indicators associated with the network nodes 110A and 110B to select one WLAN over another. As another example, when the network nodes 110A and 110B are base stations associated with a respective cellular network, the radio module 104 directs the primary radio 106 to scan when roaming from the network node 110A to the network node 110B, e.g., in response to a deteriorating connection with the network node 110A. As another example, the radio module 104 directs the primary radio 106 to scan as part of a location service. A location scan can execute to determine the location of the computing device 102 or an authorized communication channel/frequency for communications while at the location of the computing device 102. The radio module 104 may direct the primary radio 106 to scan when the primary radio 106 is configured as a soft-access-point (SoftAP), for example, to enable the radio module 104 to select specific channels to use to enable another computing device to share a wireless connection between the primary radio 106 and the network nodes 110.

To prevent communication interruptions, and to minimize power drain from scanning, the radio module 104 relies on the dedicated-scan radio 108 to aid the primary radio 106 in scanning for nearby nodes and performing other radio functions. In some cases, the dedicated-scan radio 108 consumes less power scanning than the primary radio 106 would consume during scanning. For example, the dedicated-scan radio 108 includes less powerful, less sophisticated, or fewer receivers than the primary radio 106 and therefore consumes less power listening for wireless signals than if the more-powerful, more-sophisticated, or greater-quantity of receivers of the primary radio 106 were used for scanning. With the dedicated-scan radio 108, the radio module 104 enables the computing device 102 to listen for other networks or other nearby nodes, without interrupting communications occurring on operating channels between the primary radio 106 and the network nodes 110.

The radio module 104 directs the dedicated-scan radio 108 to continuously or frequently scan for the nearby nodes, automatically and in the background relative to other scans, transmissions, and receptions, and other radio operations performed with the primary radio 106. For example, the dedicated-scan radio 108 scans for nearby nodes periodically based on a clock interrupt, a time of day, or some other periodic signal. The dedicated-scan radio 108 scans in response to a direct command from the radio module 104 to perform a scan. The dedicated-scan radio 108 scans in response to the radio module 104 not issuing a command to perform a scan for an amount of time that exceeds a maximum time threshold for waiting between scans. The dedicated-scan radio 108 may scan as frequently or infrequently, as necessary to support the radio operations performed with the primary radio 106.

The radio module 104 executes rules, or a trained machine-learned model, such as a neural network, to direct the dedicated-scan radio 108 to scan automatically, in different contexts. The radio module 104 may determine, from the scan results, that the RSSI of a signal from the network node 110A is substantially better than the RSSI of a signal from the network node 110B. Responsive to an output from a machine-learned model or rule executed by radio module 104, given the scan results, the radio module 104 may direct the primary radio 106 to search out a better signal, for example, when the RSSI of another network node exceeds the RSSI of an existing connection with a network node by a particular threshold. The radio module 104 may execute the rules or the machine-learned model as part of a control function performed to manage the primary radio 106.

Using the primary radio 106, the computing device 102 communicates with a first network node from the network nodes 110. While communicating with the first network node the computing device 102 stores the scan results 112 generated by the dedicated-scan radio 108. The dedicated-scan radio 108 can repeatedly scan for first wireless signals. The radio module 104 and the primary radio 106 perform various radio functions based on the scan results 112 generated by the dedicated-scan radio 108.

Depending on the particular radio function that the computing device 102 is performing, the radio module 104 and the primary radio 106 utilize the scan results 112 in various ways to improve efficiency and reduce latency. The radio module 104 may reconfigure the primary radio 106 based on the scan results 112. Maintaining the scan results 112 based on scans that were recently performed with the dedicated-scan radio 108 in the background enables the primary radio 106 to avoid, or to focus on, scanning certain channels or frequencies during discovery, positioning, roaming, or other radio operations.

The computing device 102 may scan, based on the scan results 112, for second wireless signals using the primary radio 106. The radio module 104 can scan with the primary radio 106 based on the scan results 112 generated by the dedicated-scan radio 108. The radio module 104 can determine a second network node of the network nodes 110 in response to scanning for the second wireless signals. The computing device 102 communicates, using the primary radio 106, with the second network node.

By using the scan results 112 as a starting point or seed for functions performed by the primary radio 106, the computing device 102 more quickly and more efficiently performs primary radio functions to minimize latency to ongoing wireless communications. For example, the computing device 102 executes a connectivity scan faster or quicker by scanning some of the pre-identified signals in the scan results 112 that have strong signal characteristics before scanning for other signals.

Figure 2:
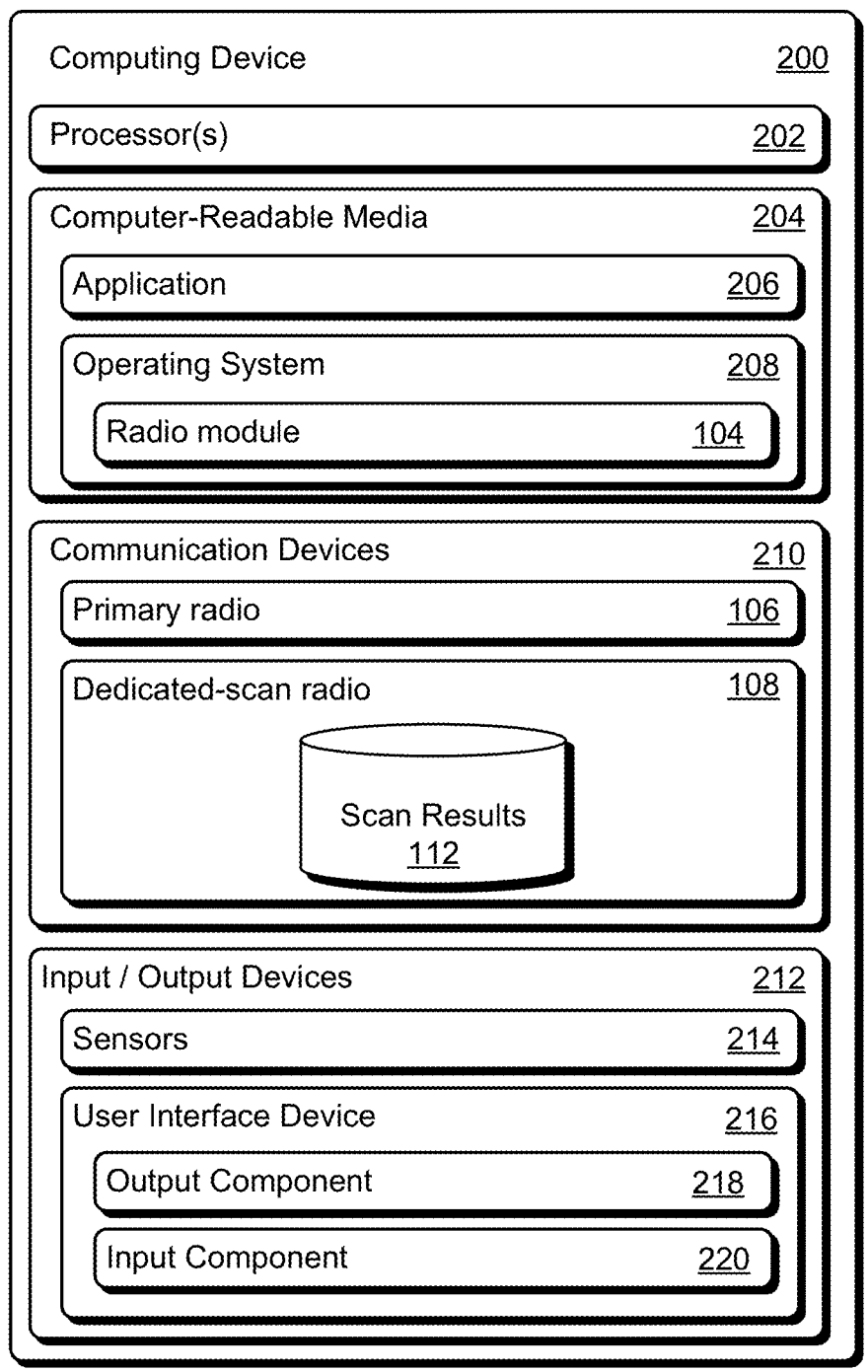
FIG. 2 is a conceptual diagram illustrating an example computing device configured to enhance wireless communications using a dedicated-scan radio.

FIG. 2 is a conceptual diagram illustrating a computing device 200 configured to enhance wireless communications using a dedicated-scan radio. The computing device 200 is an example of the computing device 102 of FIG. 2, with some additional detail. For example, the computing device 200 includes the radio module 104, the primary radio 106, the dedicated-scan radio 108, and the scan results 112 from FIG. 1. As some non-limiting examples, the computing device 200 can be a mobile phone, a laptop computer, a television/display, a desktop computer, a tablet device, a computerized watch or another wearable device, or a computing system installed in a vehicle.

In addition to the radio module 104, the primary radio 106, the dedicated-scan radio 108, and the scan results 112 from FIG. 1, the computing device 200 includes one or more processors 202, a computer-readable media 204, one or more communication devices 210, and one or more input/output (I/O) devices 212. The computer-readable media 204 includes instructions, that when executed by the processors 202, execute an application 206 and an operating system 208. The operating system 208 includes the radio module 104. In other examples, the radio module 104 is separate from the operating system 208. The communication devices 210 include the primary radio 106 and the dedicated-scan radio 108. The communication devices 210 contain the scan results 112 (or a copy of the scan results 112) generated by the dedicated-scan radio 108 in response to a completed scan. The I/O devices 212 include one or more sensors 214 and a user interface device 216. The user interface device 216 includes an output component 218 in addition to an input component 220.

The processors 202 may include any combination of one or more controllers, microcontrollers, processors, microprocessors, hardware processors, hardware processing units, digital-signal-processors, graphics processors, graphics processing units, and the like. The processors 202 may be an integrated processor and memory subsystem (e.g., implemented as a SoC), which processes computer-executable instructions to control operations of the computing device 200.

The computer-readable media 204 is configured to provide the computing device 200 with persistent and/or non-persistent storage of executable instructions (e.g., firmware, recovery firmware, software, applications, modules, programs, functions, and the like) and data (e.g., user data, operational data, scan results) to support execution of the executable instructions. Examples of the computer-readable media 204 include volatile memory and non-volatile memory, fixed and removable media devices, and any suitable memory device or electronic data storage that maintains executable instructions and supporting data. The computer-readable media 204 can include various implementations of random-access memory (RAM), read-only memory (ROM), flash memory, and other types of storage memory in various memory device configurations. The computer-readable media 204 excludes propagating signals. The computer-readable media 204 may be a solid-state drive (SSD) or a hard disk drive (HDD). The computer-readable media 204 in the example of FIG. 2 includes the application 206 and the operating system 208. The computer-readable media 204 may include or be configured as a cache.

The application 206 can be any type of executable or program that executes within or is accessible from, an operating environment of the computing device 200. Examples of the application 206 include a camera application, a messaging application, photo-editing application, a social media application, a virtual reality or augmented reality application, a video conferencing application, or other application that communicates with a network over a connection being managed by the radio module 104. For example, the application 206 is a game that relies on the radio module 104 to maintain a connection between the computing device 200 and the internet.

The operating system 208 of the computing device 200 includes the radio module 104, or some part of the radio module 104. In other examples, the radio module 104 is maintained and executed separate from the operating system 208.

The operating system 208 generally controls functionality of the computing device 200. The operating system 208 provides an execution environment for applications, such as the application 206. The operating system 208 controls task scheduling, and other general functionality, and generally does so through a system-level user interface. The operating system 208 delegates functionality to other components of the computing device 200. For example, the operating system 208 tasks the user interface device 216 to manage user input and output to the operating system 208 and user input and output associated with other applications and services executing at the computing device 200, including the application 206. The operating system 208 tasks the radio module 104 to manage network connections relied on by the operating system 208 and other applications and services executing at the computing device 200, including the application 206.

The I/O devices 212 provide connectivity to the computing device 200. The user interface device 216 of the I/O devices 212 manages input and output to a user interface of the computing device 200, for example, to manage connections to nearby networks. For example, the user interface device 216 receives instructions from the radio module 104 that cause the output component 218 to present a user interface. In response to presenting the user interface, the user interface device 216 sends the radio module 104 information about user inputs detected by the user interface device 216 in relation to the user interface. The radio module 104 controls the primary radio 106 and the dedicated-scan radio 108 in response to user inputs.

The user interface device 216 includes the output component 218 for providing output, and the user interface device 216 includes the input component 220 for receiving input. The input component 220 may be integrated with, or operatively coupled to, the output component 218. In other examples, the input component 220 operates independently of the output component 218. For example, the user interface device 216 can operate as a presence-sensitive display or touchscreen where the output component 218 includes a display and the input component 220 includes a presence-sensitive-input or touch-input component operatively coupled to (and in some cases physically integrated with) the display.

The I/O devices 212 provide additional connectivity, beyond just the user interface device 216. The sensors 214 of the I/O devices 212 obtain contextual information indicative of a physical operating environment of the computing device 200 and/or characteristics of the computing device 200 while the computing device 102 is functioning in the physical operating environment (e.g., the computing system 100). Examples of the sensors 214 include camera sensors, optical sensors, infrared sensors, radar sensors, movement sensors, temperature sensors, position sensors, proximity sensors, other light sensors, moisture sensors, pressure sensors, and the like. The application 206, the operating system 208, and the radio module 104 may tailor operations according to sensor information obtained by the sensors 214. The processors 202 can include a sensor-hub that controls the sensors 214 and provides an interface into information obtained by the sensors 214. A sensor-hub can be a low-powered processor from the processors 202, for example, relative to an application processor or graphics processor from the processors 202.

The I/O devices 212 may provide additional connectivity, beyond just the user interface device 216 and the sensors 214. Input/output devices 212 can also include data interfaces or data input ports for receiving data, including user inputs, communication data, audio data, video data, image data, and the like.

The communication devices 210 enable wired and/or wireless communication of device data between the computing device 200 and other devices, computing systems, and networks. The communication devices 210 can include receivers, transmitters, and transceivers for various types of wired and wireless communications. For example, the primary radio 106 may be a cellular radio for connecting to a base station of a cellular network. The primary radio 106 may be a short-range radio configured to connect to an access point of a WLAN.

In operation, the processors 202 execute instructions associated with the radio module 104. The radio module 104 directs the dedicated-scan radio 108, including by continuously directing the dedicated-scan radio 108 to regenerate the scan results 112. The radio module 104 and the primary radio 106 can rely on the dedicated-scan radio 108 to update the scan results 112 to perform various radio functions. By using the scan results 112 as a starting point or seed for functions performed by the primary radio 106, the computing device 200 may more quickly and more efficiently perform primary radio functions thereby minimizing latency to ongoing wireless communications.

The dedicated-scan radio 108 can continuously collect scan results 112. However, continuous scans may be unacceptable for power-sensitive applications, such as mobile devices. Instead of directing the dedicated-scan radio 108 to scan continuously, the radio module 104 may cause the dedicated-scan radio 108 to scan with a particular duty cycle or frequency that enables the computing device 102 to regulate the power consumption of the computing device 102.

The radio module 104 can determine the frequency for updating the scan results 112 based on contextual information collected by the sensors 214 and/or other components of the computing device 102. For example, the radio module 104 may use movement information obtained from the sensors 114 to determine whether the computing device 102 is moving or is stationary. In response to determining that the sensor information indicates the computing device 102 is stationary, the radio module 104 can direct the dedicated-scan radio 108 to refrain from rescanning or updating the scan results 112 as the scan results 112 are not likely to have changed. In response to determining that the sensor information indicates the computing device 102 is moving, the radio module 104 can direct the dedicated-scan radio 108 to rescan and update the scan results 112 as the scan results 112 are more likely to have changed as the computing device 102 is moving. Said differently, the radio module 104 can configure the dedicated-scan radio 108 to more frequently scan for the scan results 112 when the computing device 102 is moving. The radio module 104 can configure the dedicated-scan radio 108 to refrain from scanning or update the scan results 112 less frequently when the computing device 102 is stationary.

The radio module 104 may determine the frequency for updating the scan results 112 based on the scan results 112 cached during a previous scan. An advantage of inferring movement of the computing device 102 without relying on sensor information is the radio module 104 can avoid any detection lag issues associated with the sensors 214 that provide the information. For example, similar to using movement information from the sensors 114 to determine whether the computing device 102 is moving or is stationary, the radio module 104 can infer movement by maintaining a record of previous scan results 112 and comparing the previous scan results with the most recent scan results 112. In response to determining that the scan results 112 have not changed, the radio module 104 can direct the dedicated-scan radio 108 to decrease the frequency that the dedicated-scan radio 108 rescans and updates the scan results 112, as the scan results 112 are not likely to change very frequently. In response to determining that the scan results 112 have changed, the radio module 104 can direct the dedicated-scan radio 108 to increase the frequency that the dedicated-scan radio 108 rescans and updates the scan results 112, as the scan results 112 are more likely to change more frequently when the computing device 102 is mobile. In this way, the radio module 104 can reconfigure the dedicated-scan radio 108 according to changes in location or context of the computing device 102 more quickly and more efficiently than if the radio module 104 were to wait for sensor measurements from the sensors 114.

In some cases, the radio module 104 can filter the scan results 112 to remove wireless signals associated with a weak RSSI (e.g., an RSSI value that is less than −80 dBm) before comparing the scan results 112 to previous scan results. The radio module 104 can compensate for fluctuations in RSSI values between successive scans by determining scan results 112 are equivalent unless the scan results 112 diverge more than a particular threshold. The radio module 104 can further consider that, e.g., due to noisy environments, network nodes can be missed during successive scans, and the radio module 104 may, therefore, compare the scan results 112 to multiple previous scans before determining whether the computing device 102 is moving or is stationary.

FIGS. 3 through 8 are flowcharts illustrating example operations of a computing device configured to enhance wireless communications using a dedicated-scan radio. The operations shown in each of FIGS. 3-8 are described as being performed by the computing device 102 and in the context of the computing system 100 of FIG. 1. The operations shown in each of FIGS. 3-8 may be performed in a different order or with additional or fewer operations than what is shown.

Figure 3:
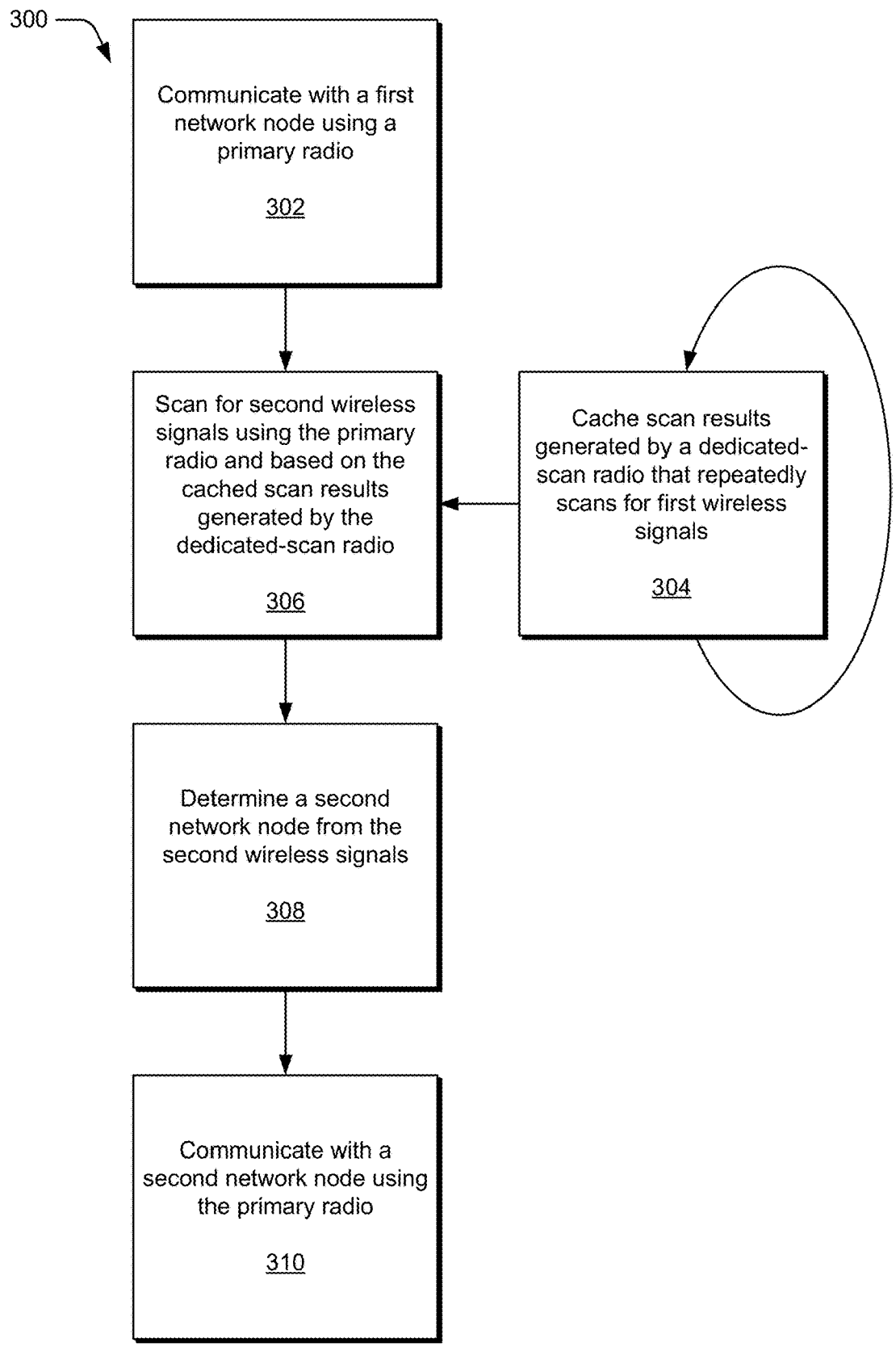
FIGS. 3 through 8 are flow-charts illustrating example operations of an example computing device configured to enhance wireless communications using a dedicated-scan radio.

FIG. 3 presents a high-level view of operations performed by the computing device 102 to enhance wireless communications using the dedicated-scan radio 108. FIGS. 4-8 show some of the operations performed by the computing device 102 to enhance wireless communications using the dedicated-scan radio 108, in more detail.

At 302, the computing device 102 communicates with a first network node using the primary radio 106. For example, the network node 110A of the computing system 100 may be an access node to a WLAN that communicates over a 5 GHz frequency band. The radio module 104 may direct the primary radio 106 to communicate with the network node 110A by sending or receiving first data, to or from the network node 110A on a first operating channel.

At 304, while the computing device 102 communicates with the first network node using the primary radio 106, the computing device 102 stores scan results 112 generated by a dedicated-scan radio 108 that repeatedly scans for first wireless signals. For example, while the computing device 102 communicates with the network node 110A over the first operating channel, the radio module 104 directs the dedicated-scan radio 108 to scan and collect information about the first wireless signals on the first channel as well as second wireless signals on other channels on the 5 GHz frequency band. The dedicated-scan radio 108 stores the information as the scan results 112.

At 306, the computing device 102 scans for second wireless signals using the primary radio 106 and based on the scan results 112 generated by the dedicated-scan radio 108. Using the scan results 112 collected while the primary radio 106 is communicating with the network node 110A, the radio module 104 may reconfigure the primary radio 106 to enhance or improve the connection to the WLAN. For example, the scan results 112 may include information about nodes 110B through 110N. The radio module 104 directs the primary radio 106 to use some of the scan results 112 to scan for a better connection to the WLAN than the connection through the network node 110A. For example, the primary radio 106 uses some of the scan results 112 to scan for a better connection periodically or in response to detecting an issue with the connection to the network node 110A.

FIGS. 4-8 show in detail how the computing device 102 performs the operation 306 to scan for second wireless signals using the primary radio 106 and based on the scan results 112 generated by the dedicated-scan radio 108. As one example, the primary radio 106 can adapt the scan based on the scan results 112 from the dedicated-scan radio 108. For example, rather than scan all the second wireless signals scanned already by the dedicated-scan radio 108, the primary radio 106 scans a subset of the second wireless signals. In other words, the primary radio 106 avoids scanning for at least one of the first wireless signals based on the scan results 112.

The primary radio 106 may scan within the operating channels associated with the network nodes 110A, 110B, and 110N if, for example, the primary radio 106 or the radio module 104 determines that the network nodes 110A, 110B, and 110N are associated with the strongest signals from the scan results 112. In other words, the primary radio 106 may scan for at least one of the first wireless signals based on the scan results 112.

In some cases, the radio module 104 uses the scan results 112 to speed up a regular scan using the primary radio 106. The computing device 102 can scan for the second wireless signals using the primary radio 106 by scanning for dynamic frequency selection signals from the second wireless signals while simultaneously scanning, using the dedicated-scan radio 108, for non-dynamic frequency selection signals from the second wireless signals. For example, the radio module 104 can direct the primary radio 106 to perform active scans for 2.4 GHz and non-DFS (Dynamic Frequency Selection) 5 GHz wireless signals and rely on the dedicated-scan radio to perform passive scans for any DFS 5 GHz wireless signals, simultaneously. In this way, the primary radio 106 and the dedicated-scan radio 108 can be used in parallel to speed up a scanning operation. The computing device 102 can rely on the dedicated-scan radio 108 to minimize scans done with the primary radio 106, completing the DFS 5 GHz scans in the background.

The computing device 102 may support an access point (e.g., SoftAP) mode where the primary radio 106 facilitates connections, from other devices to the network nodes 110. In other words, the computing device 102 can be a hotspot that provides internet access through its own connection to a service provider. To determine which channel(s) to use for the access point, the computing device 102 can rely on the scan results 112 to identify channels that are not presently being used to transmit wireless signals. Without having to execute a separate scan, the radio module 104 can configure the primary radio 106 to provide the access point through one or more of the channels that are identified in the scan results 112.

At 308, the computing device 102 determines a second network node from the second wireless signals. In response to the scan performed by the primary radio 106, the radio module 104 can determine whether the network node 110B, communicating on a different operating channel on the 5 GHz band, has a better signal than the network node 110A.

At 310, the computing device 102 communicates with a second network node using the primary radio. In response to the scan performed by the primary radio 106, the radio module 104 can reconfigure the primary radio 106 to communicate over the different operating channel on the 5 GHz band to communicate with the network node 110B to access the WLAN. As another example, in response to the scan performed by the primary radio 106, the radio module 104 can configure the primary radio 106 to keep communicating on the same operating channel to communicate with the network node 110A to access the WLAN.

Figure 4:
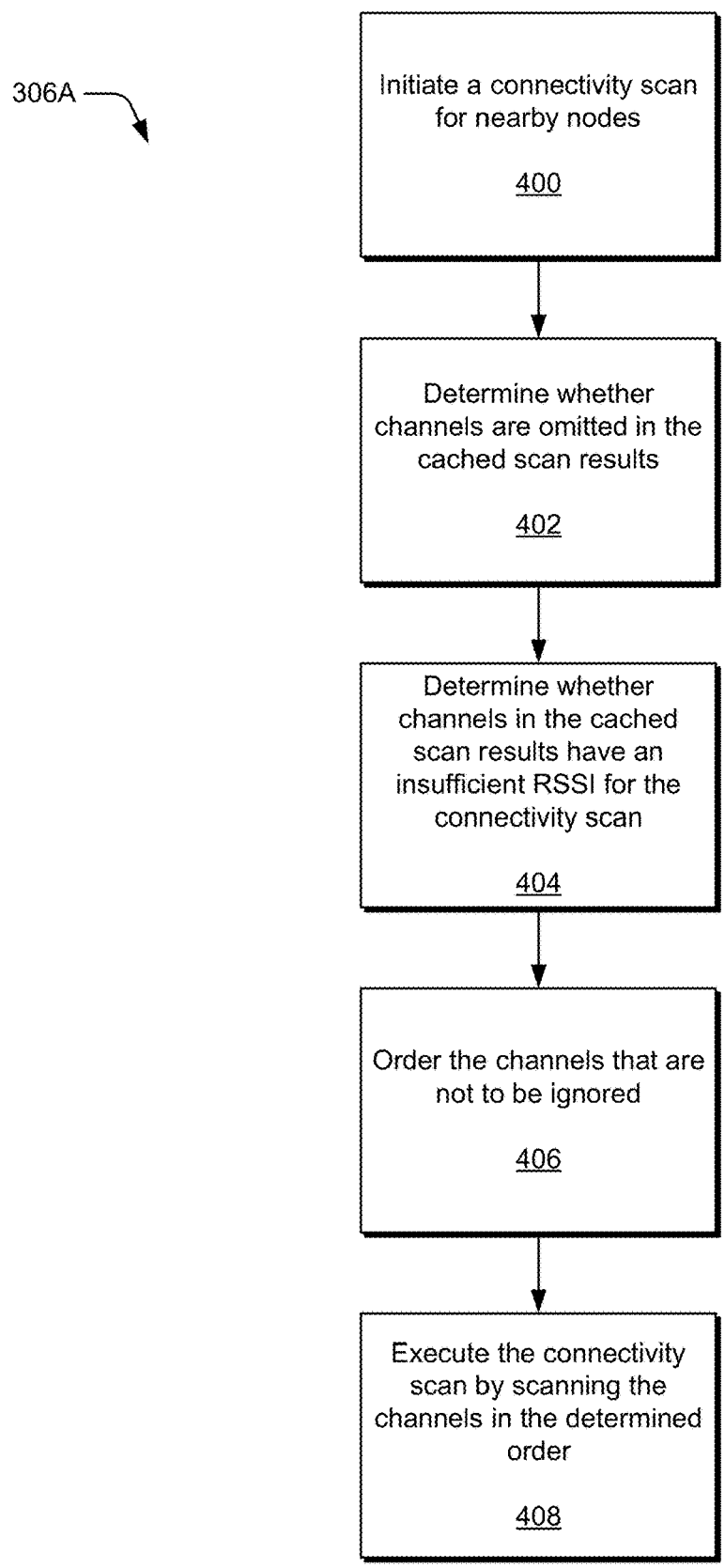

FIG. 4 shows in detail how the computing device 102 performs operations 306A as an example of the operation 306. Specifically, the computing device 102 can perform the operations 306A when the radio module 104 directs the primary radio 106 to perform a connectivity scan, if, for example, the computing device 102 is not connected to, or not communicating with any of the network nodes 110.

The dedicated-scan radio 108 may be a low-power radio, relative to the primary radio 106. For example, the dedicated-scan radio 108 may include a single receiver whereas the primary radio 106 may include multiple transceivers. In general, connectivity scans require determining RSSI from nearby network nodes 110, with high accuracy. As such, the scan results 112 generated by the dedicated-scan radio 108 may be inadequate for replacing a connectivity scan performed by the primary radio 106. However, the cached scan results 112, when used as a seed to a connectivity scan operation performed by the primary radio 106, may improve the efficiency of the connectivity scan.

At 400, the computing device 102 initiates a connectivity scan for nearby network nodes. For example, the radio module 104 directs the primary radio 106 to perform a connectivity scan to connect to a WLAN associated with one of the network nodes 110. The radio module 104 accesses the scan results 112 to seed the connectivity scan.

At 402, the computing device 102 determines whether channels indicated in the scan results 112 are omitted and therefore can be ignored. For example, the radio module 104 focuses the connectivity scan to only occur using the channels that are identifiable from the scan results 112 because channels with no scan results are ignored during a connectivity scan.

At 404, the computing device 102 determines whether channels indicated in the scan results 112 have an insufficient RSSI indicated in the scan results 112 and therefore can be ignored. For example, the radio module 104 focuses the connectivity scan to only occur using the channels that have an RSSI, inferred from information in the scan results 112, that exceeds a minimum RSSI threshold.

At 406, the computing device 102 determines an order for scanning the channels that are not being ignored from the connectivity scan. For example, the radio module 104 reorders the scan results based on the inferred RSSI from the scan results 112 to configure the primary radio 106 to scan the channels with greater RSSI values before scanning any other channels that are not to be ignored.

At 408, the computing device 102 executes the connectivity scan by scanning the channels in the determined order. For example, the primary radio 106 scans the channels determined from the scan results, starting with the channels with the higher RSSI values first, ignoring the channels that did not show up in the scan results 112 and also ignoring the channels do not have sufficient RSSI values. In this way, the computing device 102 performs a connectivity scan more efficiently, without wasting power and time scanning channels that are not likely to be suitable connections.

Figure 5:
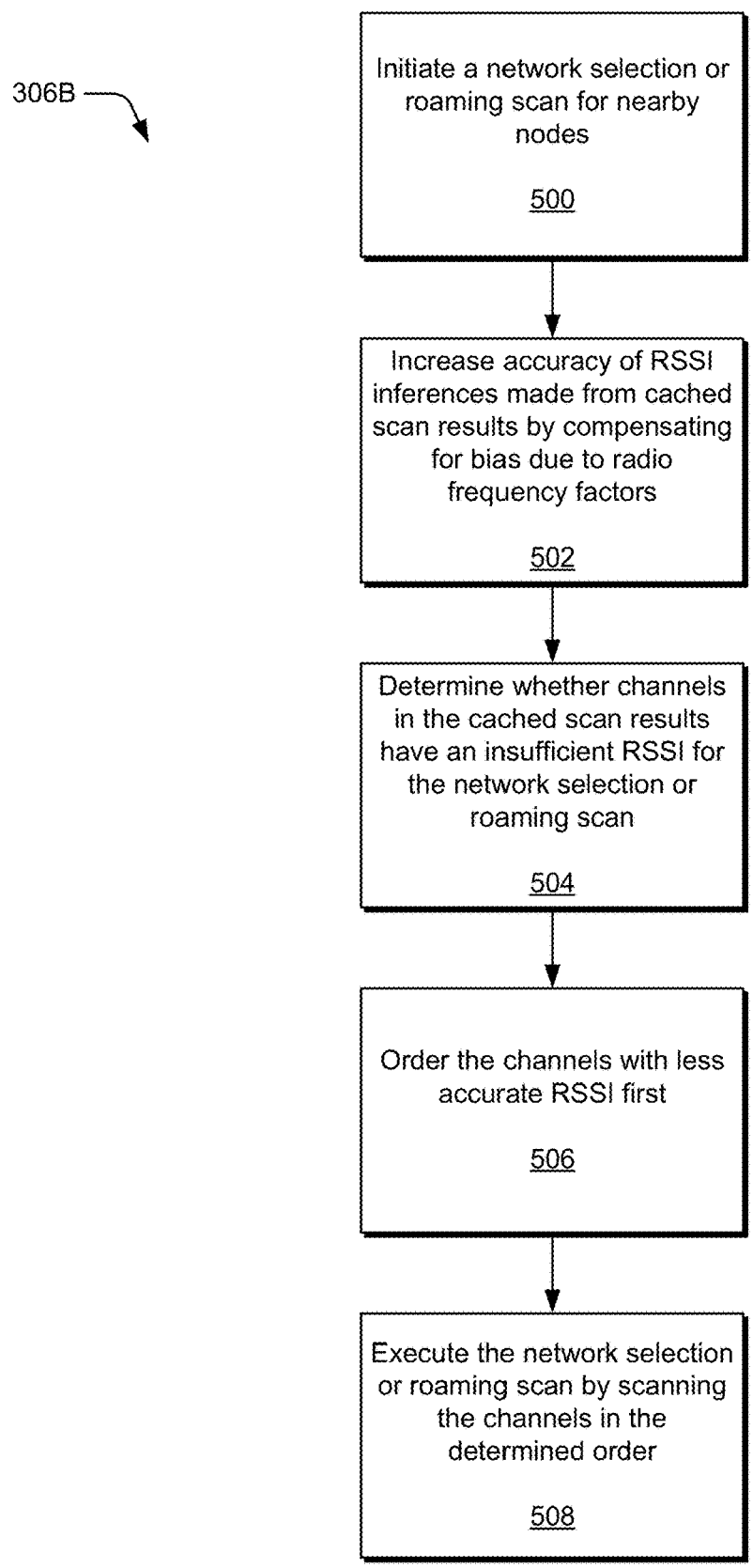

FIG. 5 shows in detail how the computing device 102 performs operations 306B as an example of the operation 306. Specifically, the computing device 102 can perform the operations 306B when the radio module 104 directs the primary radio 106 to perform a network selection operation or when performing a roaming operation. For example, the computing device 102 is connected to the internet through a cellular connection to one of the network nodes 110 and is searching for a better connection to the internet through a different cellular connection. Likewise, the computing device 102 may instead get disconnected from a cellular connection to one of the network nodes 110 and may need to perform a network search or roam operation to search or roam for a new connection.

At 500, the computing device 102 initiates a network selection or roaming scan for nearby network nodes. In general, the computing device 102 may perform a network selection or roaming operation when the radio module 104 determines that an operating channel quality degrades below a quality threshold. The radio module 104 may use various quality metrics associated with an operating channel, including current RSSI and cooperative collision avoidance (CCA) busy state, as conditions for executing a network selection operation to scan for other channels and a new access point. Rather than interrupt ongoing communication with the primary radio 106, and rather than requiring the primary radio 106 to blindly execute a network scan or roaming operation, the radio module 104 directs the dedicated-scan radio 108 to listen to compile the scan results 112. The radio module 104 configures the primary radio 106 to perform enhanced network selection and roaming guided by the cached scan results 112 and by the RSSI and CCA values that are continuously being updated by the radio module 104 and the dedicated-scan radio.

Regarding CCA busy, the computing device 102 can rely on the cached scan results 112 to determine the CCA busy state for inferring channel congestion. For example, to determine the CCA busy state, the radio module 104 may need to take CCA measurements over a greater amount of time than a normal dwell time used for scanning. By using the scan results 112, the computing device 102 can report the CCA busy state more quickly than if the computing device 102 relied on the primary radio 106 to complete a CCA scan.

At 502, the computing device 102 increases the accuracy of RSSI inferences made from the cached scan results 112. For example, the radio module 104 modifies the scan results 112 to prepare for a roaming or network selection scan. If an RSSI value inferred from the scan results 112 has a bias (positive or negative) due to some radio frequency factors, the radio module 104 can compensate the scan results 112 for the bias by adding or subtracting a delta value corresponding to the bias, to produce a more accurate RSSI value.

At 504, the computing device 102 determines whether channels in the scan results that have an RSSI value have an insufficient RSSI for performing a network selection or roaming scan. For example, if an RSSI value inferred from the scan results 112 lacks accuracy, the radio module 104 directs the primary radio 106 to execute the network selection or the roaming scan on the channels with inaccurate RSSI measurements first. The primary radio 106 obtains an accurate RSSI measurement to evaluate against other channels' RSSI measurements previously taken and compensated for.

At 506, the computing device 102 orders the channels with less accurate RSSI measurements first. For example, the radio module 104 causes the primary radio 106 to execute the network selection or roaming scan on the channels with less accurate RSSI measurements initially to obtain more accurate RSSI-measurements. As more accurate RSSI measurements are obtained during the scan with the primary radio 106, the radio module 104 evaluates the more accurate RSSI measurements against any of the previously recorded RSSI measurements in completing the scan.

At 508, the computing device 102 executes the network selection or roaming scan by scanning the channels in the determined order. For example, starting with the channels with less accurate RSSI measurements first, the radio module 104 directs the primary radio 106 to scan each of the less accurate channels to obtain more accurate RSSI measurements.

In some examples, the computing device 102 executes the network selection or roaming scan by performing similar operations to the operations 402 through 406 from FIG. 4. For example, with more accurate RSSI measurements for the other channels identified in the scan results 112, the radio module 104 determines whether channels indicated in the scan results 112 are omitted and therefore can be ignored (402), determines whether channels indicated in the scan results 112 have too low of an RSSI and therefore can be ignored (404), and determines an order for scanning the channels that are not being ignored from the network selection or roaming scan. In this way, the computing device 102 performs a network selection scan more efficiently and more quickly, without wasting power and time scanning channels that are not likely to be suitable connections.

Figure 6:
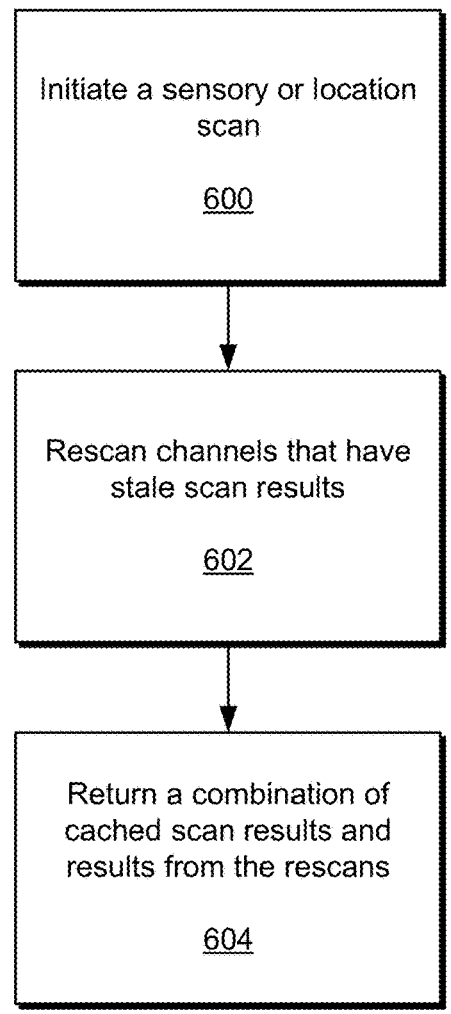

FIG. 6 shows in detail how the computing device 102 performs operations 306C as an example of the operation 306. Specifically, the computing device 102 can perform the operations 306C when the radio module 104 directs the primary radio 106 to perform a sensory or location scan operation. For example, applications executing at the computing device 102 use location information and contextual information to perform contextually dependent functions. The computing device 102 can perform a radio scan to determine the location of the computing device 102 and can also perform the radio scan to define a general context of the computing device. For example, the computing device 102 can rely on a runtime environment for a sensor hub or a context hub to obtain sensor information and other information about an operating environment of the computing device 102 and use the information to define a context of the computing device 102. The sensor hub may rely on radio scans to better define the context and the operating environment.

At 600, the computing device 102 initiates a sensory or location scan operation. The requestor of the sensory or location scan operation (e.g., the sensor hub, or an application) may not need highly accurate RSSI values to define a location or context. However, the requestor may require scan results to be obtained recently. To perform sensory or location-dependent functions, an initiator of a sensory or location scan needs to obtain scan results quickly. The scan results 112 can become stale, for example, in response to the radio module 104 determining that a timestamp of the scan results 112 exceeds a certain time threshold or age. Rather than rescan to obtain all new scan results 112, the radio module 104 directs the primary radio 106 to only scan the channels with old or stale data.

At 602, the computing device 102 rescans channels that have stale scan results. For example, the radio module 104 determines from timestamps associated with the scan results 112, which, if any of the scan results 112, is too old to be used to respond to the sensory or location scan. The radio module 104 identifies communication channels from a first version of the scan results 112 with a respective timestamp that exceeds a time threshold. For a scan result that has a timestamp that exceeds a threshold, the radio module 104 may direct the primary radio 106 or the dedicated-scan radio 108 to perform a rescan. For other scan results that are not as old and that have timestamps that do not exceed the threshold, the radio module 104 may refrain from directing the primary radio 106 or the dedicated-scan radio 108 to perform a rescan. The radio module 104 generates a second version of the scan results 112 by scanning the communication channels from the first version of the scan results 112 with the respective timestamp that exceeds the time threshold, without rescanning other communication channels from the first version of the scan results 112.

The radio module 104 can determine the age of scan results 112 in other ways. The scan results 112 may be saved as a first-in-first-out (FIFO) buffer. The radio module 104 can determine the age of a scan result in the FIFO buffer based on a position of the scan results within the FIFO buffer. The radio module 104 may determine the age of a particular result based on how frequently an old scan result is removed from the FIFO buffer as a new scan result is added to the FIFO buffer. Based on this update frequency, the radio module 104 can assign a duration of time to each position in the FIFO buffer and determine the age of a scan result based on the duration of time assigned to the position of the scan result in the FIFO buffer. For example, the duration of time at the input or first position of the buffer is a minimum time threshold, the duration of time at the output or last position of the buffer is a maximum time threshold, and the duration of time for each position in between the first and last positions successively increases by a fixed amount that equates to a difference in the maximum and minimum time thresholds divided by the number of positions between the first and last positions.

At 604, the computing device 102 returns a combination of cached scan results and results from the rescans. The radio module 104 can deliver the scan results 112, modified by any rescans performed at 602, to the requestor or the initiator of the sensory or location scan operation. The radio module 104 returns a combination of the second version of the scan results 112 and a portion of the first version of the scan results 112 that are associated with the other communication channels from the first version of the scan results 112 that were not rescanned when generating the second version of the scan results 112.

Figure 7:
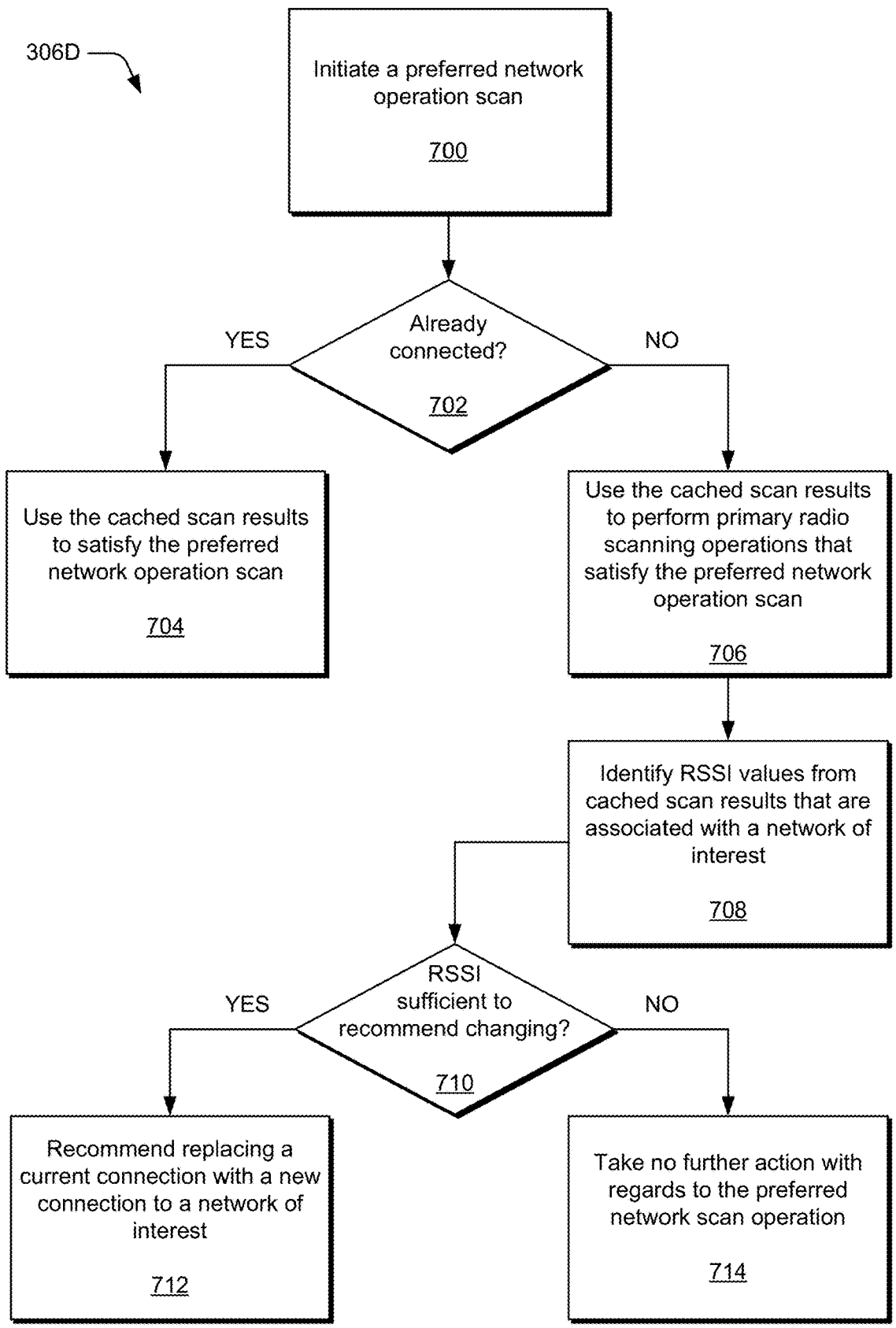

FIG. 7 shows in detail how the computing device 102 performs operations 306D as an example of the operation 306. Specifically, the computing device 102 can perform the operations 306D when the radio module 104 directs the primary radio 106 to perform a PNO scan.

At 700, the computing device 102 initiates a preferred network operation scan. For example, when the computing device 102 is in a sleep mode or a standby mode, and a display (e.g., the output component 218 of the user interface device 216) is powered off, the computing device 102 may occasionally need to connect to the internet or other network to obtain information for updating the operating system or other applications executing at the computing device 102. Rather than rely on the primary radio 106 to perform a PNO scan to identify a preferred network, the computing device 102 can utilize the dedicated-scan radio 108 and the cached scan results 112 to find a preferred network connection without requiring the primary radio 106 to scan.

At 702, the computing device 102 determines whether to initiate a connected PNO scan or a disconnected PNO scan. For example, the radio module 104 determines whether the primary radio 106 is connected to any of the network nodes 110. If connected to any of the network nodes, the radio module 104 performs a connected PNO scan at 706. Otherwise, the radio module 104 performs a disconnected PNO scan at 704.

At 704, the computing device 102 uses the cached scan results to satisfy the preferred network operation scan. For example, in response to determining that the primary radio 106 is disconnected, the radio module 104 directs the primary radio 106 and the dedicated-scan radio 108 to execute the disconnected PNO scan by using the scan results 112 already cached in the background, without scanning for additional scan results using the dedicated-scan radio 108 or the primary radio 106. The scan results 112 may indicate a list of networks or the network nodes 110 with respective RSSI values and other characteristics. The radio module 104 can use the scan results 112 to perform the preferred network operation without having to perform a scan using the primary radio 106. The dedicated-scan radio 108 can collect the scan results 112 in the background that will satisfy the disconnected PNO scan. In some cases, the dedicated-scan radio 108 consumes less power than the primary radio 106. The dedicated-scan radio 108 can update the scan results 112 to perform a preferred network operation using less power than if the primary radio 106 were to wake to perform a scan.

At 706, the computing device 102 uses the cached scan results to perform primary radio scanning operations that satisfy the preferred network operation scan. For example, in response to determining that the primary radio 106 is connected to any of the network nodes 110, the radio module 104 directs the primary radio 106 and the dedicated-scan radio 108 to implement a connected PNO scan using the scan results 112 already cached in the background.

In connected PNO, the radio module 104 may obtain a list of networks or network nodes (e.g., service set identifier or SSID) of interest. The radio module 104 can occasionally direct the dedicated-scan radio 108 to scan again and to regenerate the scan results 112. In response to identifying a network or network node in the scan results 112 that is from the list of networks or network nodes of interest, the radio module 104 can evaluate whether to recommend the network, e.g., to an operating system.

At 708, computing device 102 identifies RSSI values from the cached scan results that are associated with a network of interest that is also found in the list of networks or network nodes of interest. For example, while connected to the network node 110A, the radio module 104 determines from the scan results 112 that the network node 110B has a particular RSSI value. The radio module 104 can determine that the network node 110B is on the list of networks or network nodes of interest. In response to identifying the network node 110B on the list of networks or network nodes of interest, the radio module 104, without requiring scanning operation of the primary radio 106, evaluates whether the computing device 102 should maintain the connection to the network node 110A or switch to the network node 110B.

At 710, the computing device 102 determines whether RSSI values are sufficient to recommend switching networks. For example, in cases where the radio module 104 determines that the network node 110B has a respective RSSI value inferable from the scan results 112, the radio module 104 determines whether the respective RSSI value satisfies a threshold sufficient to recommend switching from the network node 110A to the network node 110B. The RSSI threshold may correspond to the RSSI value of a current network connection with the network node 110A. The RSSI threshold may be an amount or percentage greater than the RSSI value of the current network connection to ensure the computing device 102 realizes sufficient benefit in making a connection change.

At 712, the computing device 102 recommends replacing a current connection with a new connection to a network of interest in response to determining that the RSSI values from the cached scan results are sufficient. For example, if the RSSI value of the network node 110B exceeds the RSSI values of the network node 110A, the radio module 104 may direct, or recommend that the operating system direct the primary radio 106 to cease communicating with the network node 110A to instead establish communication with the network node 110B.

At 714, the computing device 102 does not recommend replacing a current connection with a new connection and instead takes no further action with regards to the preferred network scan operation. For example, if the RSSI value of the network node 110B does not exceed the RSSI values of the network node 110A by a sufficient amount, the radio module 104 may refrain from directing, or recommending that the primary radio 106 establish communication with the network node 110B.

Even if a difference in RSSI values between a current and possibly new connection is not sufficient to warrant recommending a change, the new connection may still be worth establishing if the current connection deteriorates. In this scenario, the radio module 104 maintains information for establishing communication with the network node 110B as an instant preferred network connection when the connection to the network node 110A deteriorates. For example, the computing device 102 wakes with a poor connection to the network node 110A and the radio module 104 directs the primary radio 106 to immediately establish a connection with the network node 110B, the radio module 104 having previously identified the network node 110B from the cached scan results 112.

Figure 8:
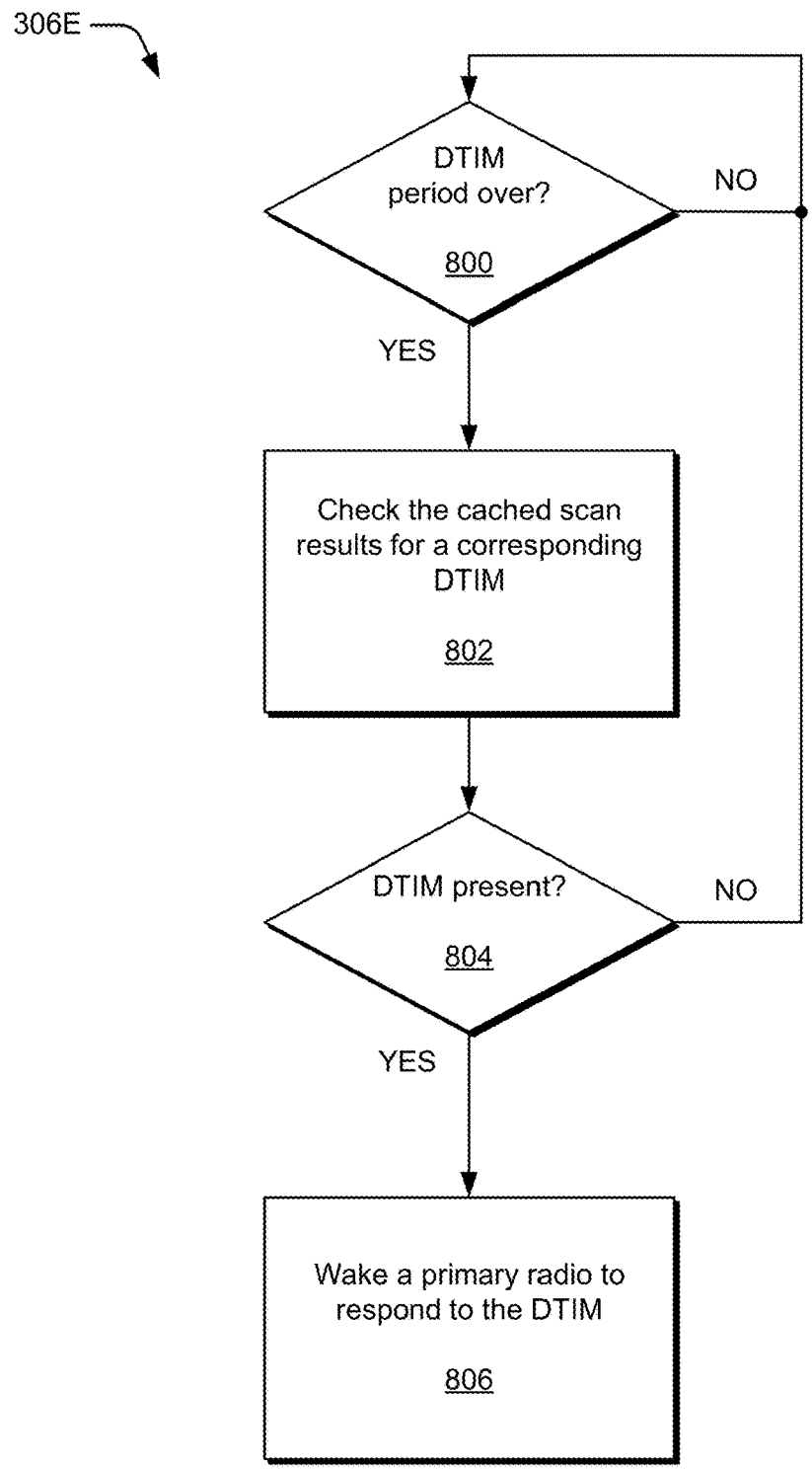

FIG. 8 shows in detail how the computing device 102 performs operations 306E as an example of the operation 306. Specifically, the computing device 102 can perform the operations 306E to save power, minimizing time spent using the primary radio 106 to respond to a traffic indication message (TIM) or a delivery traffic indication message (DTIM).

In some wireless communications, such as IEEE 802.11 standard-based communications, a computing device can sleep for a period of time (e.g., a DTIM period, a TIM period). DTIM is used for communicating multicast or broadcast frames, and TIM is for communicating unicast frames. TIM is included in every beacon or communication frame while DTIM presents only in a final beacon or communication frame after receiving one or more previous beacon or communication frames. Depending on whether a DTIM or TIM bit in a beacon or communication frame is set, the computing device 102 sleeps or refrains from sleeping.

While the computing device sleeps, a network node buffers data intended for the sleeping computing device. The network node broadcasts a DTIM so that when the computing device wakes, the computing device can respond to the DTIM to obtain the buffered data. For a lower DTIM, the computing device may be more responsive because the computing device receives data faster as the data is not buffered as long, but at the expense of higher power consumption because the computer device operates outside the sleep or power-save mode. For a higher DTIM, the computing device can be more power efficient, but traffic latency increases as data for the computing device is buffered and not responded to while the computing device remains dormant. For example, at the end of every DTIM cycle, the primary radio 106 can check whether any buffered data is waiting for the computing device 102, however frequently waking the primary radio 106 according to the DTIM cycle can unnecessarily consume power if no data is waiting.

Rather than wake the primary radio 106 at the end of every DTIM to check whether any buffered data is waiting for the computing device 102, the dedicated-scan radio 108 can be used to check for awaiting data in the background. At the end of a DTIM, the radio module 104 can refrain from waking the primary radio 106 unless the cached scan results 112 indicate waiting buffered data.

The radio module 104 may let the primary radio 106 operate in a dormant state for a period of time referred to as "a DTIM period." While the primary radio 106 is unused, the dedicated-scan radio 108 collects the scan results 112 in the background by waking and scanning during the DTIM period. At 800, the computing device 102 determines whether the DTIM period is over.

At 802, when the DTIM period is over, the computing device 102 checks the cached scan results for a corresponding DTIM. For example, the radio module 104 can determine whether the DTIM has been set for traffic associated with a current operating channel.

At 804, in response to not detecting a DTIM present, the radio module 104 directs the primary radio 106 to resume sleeping for another DTIM period. In contrast, at 806, the radio module 104 directs the primary radio 106 to wake to respond to the DTIM responsive to detecting the DTIM present at 804. In other words, in response to determining that a DTIM period is over, the radio module 104 wakes the primary radio 106 to respond to a DTIM identified from the scan results 112, or the radio module 104 refrains from waking the primary radio 106 for another DTIM period.

In this way, the dedicated-scan radio 108 optimizes DTIM operations performed by the primary radio 106. At the end of a DTIM period, the dedicated-scan radio 108 scans the operating channel only, and based on the scan results 112, the radio module 104 selectively wakes or refrains from waking the primary radio. The DTIM can be set short, ensuring low latency in network traffic, minimizing power consumed activating, and scanning using the primary radio 106.

Clause 1. A computer-implemented method exchanging, using a primary radio of a computing device, first data with a first network node; while communicating with the first network node using the primary radio, storing scan results generated by a dedicated-scan radio of the computing device that repeatedly scans for first wireless signals; scanning, using the primary radio and based on the scan results generated by the dedicated-scan radio, for second wireless signals; determining a second network node from the second wireless signals; and communicating, using the primary radio, with the second network node from the second wireless signals.

Clause 2. The computer-implemented method of clause 1, wherein scanning for the second wireless signals includes scanning for at least one of the first wireless signals based on the scan results.

Clause 3. The computer-implemented method of clause 1, wherein scanning for the second wireless signals includes avoiding at least one of the first wireless signals based on the scan results.

Clause 4. The computer-implemented method of any of clauses 1-3, wherein the first network node and the second network node are the same network node or different network nodes.

Clause 5. The computer-implemented method of clauses 1-4, wherein scanning for the second wireless signals includes executing a connectivity scan comprising: determining whether communication channels are omitted from the scan results; and scanning, using the primary radio, included communication channels from the scan results without scanning the communication channels that are omitted from the scan results.

Clause 6. The computer-implemented method of clause 6, further comprising: prior to scanning the included communication channels from the scan results without scanning the communication channels that are omitted from the scan results, ordering the included communication channels based on respective received signal strength intensity indicators associated with each of the scan results.

Clause 7. The computer-implemented method of clauses 1-6, wherein scanning for the second wireless signals includes executing a network selection or roaming scan comprising: after omitting communication channels from the scan results with a respective received signal strength intensity indicator that does not satisfy a threshold, ordering, based on the respective received signal strength intensity indicators associated with each of the scan results, the communication channels from the scan results in order of lowest received signal strength intensity to highest received signal strength intensity; and scanning, using the primary radio, the ordered communication channels that were not omitted from the scan results.

Clause 8. The computer-implemented method of clauses 1-7, wherein the scan results are first scan results and scanning for the second wireless signals includes executing a sensory or location scan comprising: identifying communication channels from the first scan results with a respective timestamp that exceeds a time threshold; generating second scan results by scanning the communication channels from the first scan results with the respective timestamp that exceeds the time threshold, without rescanning other communication channels from the first scan results; and returning a combination of the second scan results and a portion of the first scan results associated with the other communication channels from the first scan results that were not rescanned when generating the second scan results.

Clause 9. The computer-implemented method of clauses 1-8, further comprising: determining, based on the scan results generated by the dedicated-scan radio, cooperative collision avoidance for the second wireless signals; and exchanging, using the primary radio and based on the cooperative collision avoidance, the second data with the second network node from the second wireless signals.

Clause 10. The computer-implemented method of clauses 1-9, wherein scanning for the second wireless signals includes: in response to determining that a delivery traffic indication message period is over: waking the primary radio to respond to a delivery traffic indication message identified from the scan results; or refraining from waking the primary radio for another delivery traffic indication message period.

Clause 11. The computer-implemented method of clauses 1-10, wherein scanning for the second wireless signals includes scanning, using the primary radio, for dynamic frequency selection signals from the second wireless signals while simultaneously scanning, using the dedicated-scan radio, for non-dynamic frequency selection signals from the second wireless signals.

Clause 12. The computer-implemented method of clauses 1-11, wherein scanning for the second wireless signals comprises continuously scanning for the second wireless signals.

Clause 13. The computer-implemented method of clauses 1-12, wherein scanning for the second wireless signals comprises regulating power consumed during the scanning for the second wireless signals by scheduling the scanning for the second wireless signals to occur with a particular duty cycle or frequency.

Clause 14. A computing device comprising at least one processor configured to perform any of the methods of clauses 1-13.

Clause 15. A computer-readable storage medium comprising instructions that, when executed, configure a processor of a computing device to perform any of the methods of clauses 1-13.

Clause 16. A system comprising means for performing any of the methods of clauses 1-13.

Clause 17. A computing system comprising a computing device communicatively coupled to a remote server, the computing system being configured to perform any of the methods of clauses 1-13.

While various preferred embodiments of the disclosure are described in the foregoing description and shown in the drawings, it is to be distinctly understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method at a computing device, the method comprising:
    communicating, using a primary radio of the computing device, with a first network node;
    while communicating with the first network node using the primary radio, storing scan results generated by a dedicated-scan radio of the computing device that repeatedly scans for first wireless signals, wherein the scan results include first scan results for communication channels and further include second scan results for a rescan of at least one communication channel of the first scan results in response to a timestamp associated with the first scan results exceeding a time threshold, wherein the second scan results are generated by selecting communication channels to scan based on a timestamp comparison indicating a frequency of updates to the scan results for the communication channels;
    scanning, using the primary radio and based on the scan results generated by the dedicated-scan radio, for second wireless signals, including performing the scanning according to one or more channel quality indicators in the scan results;
    determining a second network node from the second wireless signals; and
    communicating, using the primary radio, with the second network node from the second wireless signals.

2. The method of claim 1, wherein scanning for the second wireless signals includes scanning for at least one of the first wireless signals based on the scan results.

3. The method of claim 1, wherein scanning for the second wireless signals includes avoiding at least one of the first wireless signals based on the scan results.

4. The method of claim 1, wherein the first network node and the second network node are different network nodes.

5. The method of claim 1, wherein scanning for the second wireless signals includes executing a connectivity scan that comprises:
    determining whether communication channels are omitted from the scan results; and
    scanning, using the primary radio, included communication channels that are included in the scan results without scanning the communication channels that are omitted from the scan results.

6. The method of claim 5, further comprising:
prior to scanning the included communication channels from the scan results without scanning the communication channels that are omitted from the scan results, ordering the included communication channels based on respective received signal strength intensity (RSSI) indicators associated with each of the scan results.

7. The method of claim 1, wherein scanning for the second wireless signals includes executing a network selection or roaming scan that comprises:
after omitting communication channels from the scan results with a respective received signal strength intensity indicator (RSSI) that does not satisfy a threshold, ordering, based on the RSSI indicators associated with each of the scan results, the communication channels from the scan results in order of lowest RSSI to highest RSSI; and
scanning, using the primary radio, the ordered communication channels that were not omitted from the scan results.

8. The method of claim 1, wherein the scan results are first scan results and scanning for the second wireless signals includes executing a sensory or location scan that comprises:
identifying communication channels from the first scan results with a respective timestamp that exceeds a time threshold;
generating second scan results by scanning the communication channels from the first scan results with the respective timestamp that exceeds the time threshold, without rescanning other communication channels from the first scan results; and
returning a combination of the second scan results and a portion of the first scan results associated with the other communication channels from the first scan results that were not rescanned when generating the second scan results.

9. The method of claim 1, further comprising:
determining, based on the scan results generated by the dedicated-scan radio, cooperative collision avoidance for the second wireless signals; and
exchanging, using the primary radio and based on the cooperative collision avoidance, data with the second network node from the second wireless signals.

10. The method of claim 1, wherein scanning for the second wireless signals includes:
in response to determining that a delivery traffic indication message (DTIM) period is over:
waking the primary radio to respond to a delivery traffic indication message identified from the scan results; or
refraining from waking the primary radio for another DTIM period.

11. The method of claim 1, wherein scanning for the second wireless signals includes scanning, using the primary radio, for dynamic frequency selection signals from the second wireless signals while simultaneously scanning, using the dedicated-scan radio, for non-dynamic frequency selection signals from the second wireless signals.

12. The method of claim 1, wherein scanning for the second wireless signals comprises continuously scanning for the second wireless signals.

13. The method of claim 1, wherein scanning for the second wireless signals comprises regulating power consumed during the scanning for the second wireless signals by scheduling the scanning for the second wireless signals to occur with a particular duty cycle or frequency.

14. The method of claim 1, further comprising:
responsive to detecting a movement state of the computing device, dynamically adjusting a scanning frequency of the dedicated-scan radio based on the movement state, wherein the scanning frequency is increased when the computing device is in motion and decreased when the computing device is stationary.

15. The method of claim 1, wherein the second scan results are further generated by:
dynamically adjusting a scanning frequency of the primary radio based on a likelihood that a signal associated with one or more of the communication channels has changed.

16. A computing device comprising at least one processor configured to:
communicate, using a primary radio of the computing device, with a first network node;
while the computing device is communicating with the first network node using the primary radio, store scan results generated by a dedicated-scan radio of the computing device that repeatedly scans for first wireless signals, wherein the scan results include first scan results for communication channels and further include second scan results for a rescan of at least one communication channel of the first scan results in response to a timestamp associated with the first scan results exceeding a time threshold, wherein the second scan results are generated by selecting communication channels to scan based on a timestamp comparison indicating a frequency of updates to the scan results for the communication channels;
scan, using the primary radio and based on the scan results generated by the dedicated-scan radio, for second wireless signals, including performing the scanning according to one or more channel quality indicators in the scan results;
determine a second network node from the second wireless signals; and
communicate, using the primary radio, with the second network node from the second wireless signals.

17. The computing device of claim 16, wherein the processor, in scanning for the second wireless signals, is configured to execute a connectivity scan that comprises:
determine whether communication channels are omitted from the scan results; and
scan, using the primary radio, included communication channels that are included in the scan results without scanning the communication channels that are omitted from the scan results.

18. A non-transitory computer-readable storage medium comprising instructions that, when executed, configure a processor of a computing device to:
communicate, using a primary radio of the computing device, with a first network node;
while the computing device is communicating with the first network node using the primary radio, store scan results generated by a dedicated-scan radio of the computing device that repeatedly scans for first wireless signals, wherein the scan results include first scan results for communication channels and further include second scan results for a rescan of at least one communication channel of the first scan results in response to a timestamp associated with the first scan results exceeding a time threshold, wherein the second scan results are generated by selecting communication channels to scan based on a timestamp comparison indicating a frequency of updates to the scan results for the communication channels;

scan, using the primary radio and based on the scan results generated by the dedicated-scan radio, for second wireless signals, including performing the scanning according to one or more channel quality indicators in the scan results;

determine a second network node from the second wireless signals; and communicate, using the primary radio, with the second network node from the second wireless signals.

19. The computing device of claim 16, wherein scanning for the second wireless signals includes avoiding at least one of the first wireless signals based on the scan results.

20. The computing device of claim 17, wherein the processor is further configured to:

prior to scanning the included communication channels from the scan results without scanning the communication channels that are omitted from the scan results, order the included communication channels based on respective received signal strength intensity (RSSI) indicators associated with each of the scan results.

\* \* \* \* \*